(12) United States Patent
Feustel et al.

(10) Patent No.: US 7,187,838 B2
(45) Date of Patent: Mar. 6, 2007

(54) SYSTEM AND APPARATUS FOR RADIAL OPTICAL DISTRIBUTION

(75) Inventors: Clay A. Feustel, Lawrenceville, GA (US); Daniel Hendrickson, Roswell, GA (US); Hongbo Zhang, Duluth, GA (US)

(73) Assignee: Furukawa Electric North America, Inc., Norcross, GA (US)

( * ) Notice: Subject to any disclaimer, the term of this patent is extended or adjusted under 35 U.S.C. 154(b) by 88 days.

(21) Appl. No.: 11/041,813

(22) Filed: Jan. 24, 2005

(65) Prior Publication Data

US 2006/0165365 A1 Jul. 27, 2006

(51) Int. Cl.
G02B 6/00 (2006.01)
(52) U.S. Cl. .................... 385/135; 385/134
(58) Field of Classification Search ............. 385/135, 385/134; 174/59, 60; 398/61, 63, 66, 165–167.5
See application file for complete search history.

(56) References Cited

U.S. PATENT DOCUMENTS

| | | | | |
|---|---|---|---|---|
| 5,212,761 | A * | 5/1993 | Petrunia .................... | 385/135 |
| 5,884,003 | A * | 3/1999 | Cloud et al. ................ | 385/135 |
| 6,183,265 | B1 | 2/2001 | Dillat et al. | |
| 6,275,641 | B1 * | 8/2001 | Daoud ........................ | 385/135 |
| 6,284,972 | B1 | 9/2001 | Dillat et al. | |
| 6,434,313 | B1 * | 8/2002 | Clapp et al. ................ | 385/135 |
| 6,561,454 | B1 * | 5/2003 | White, III .................... | 244/1 R |
| 6,621,975 | B2 * | 9/2003 | Laporte et al. ............. | 385/135 |
| 6,760,530 | B1 * | 7/2004 | Mandry ....................... | 385/135 |
| 6,970,653 | B1 * | 11/2005 | Dudley ........................ | 398/169 |
| 2002/0051616 | A1 * | 5/2002 | Battey et al. ............... | 385/135 |
| 2003/0048999 | A1 * | 3/2003 | Imabayashi et al. .......... | 385/88 |
| 2003/0174996 | A1 * | 9/2003 | Henschel et al. ........... | 385/135 |
| 2005/0158048 | A1 * | 7/2005 | Sung et al. .................. | 398/66 |
| 2006/0093303 | A1 * | 5/2006 | Reagan et al. ............. | 385/135 |

FOREIGN PATENT DOCUMENTS

EP  1684449 A2 *  7/2006

* cited by examiner

*Primary Examiner*—John D. Lee
*Assistant Examiner*—Rhonda S. Peace

(57) ABSTRACT

Embodiments of the invention include an apparatus and system for managing and radially distributing optical fibers from a first location, such as a central office, to a plurality of destination locations, such as homes within a neighborhood. The apparatus includes a distribution panel having a central hub or ring, and both a plurality of optical input elements and a plurality of optical output elements disposed radially around the central hub. The optical input elements split the fibers coupled from the first location into a plurality of individual fibers that are routed to the central hub. The central hub radially distributes the plurality of fibers to appropriate optical output elements, which are coupled to destination fibers routed to the plurality of destination locations. The radial configuration of the apparatus provides a central breakout point for fiber distribution, thus improving fiber organization and routing management compared to conventional routing and distribution systems.

18 Claims, 4 Drawing Sheets

SYSTEM AND APPARATUS FOR RADIAL OPTICAL DISTRIBUTION

BACKGROUND OF THE INVENTION

1. Field of Invention

The invention relates to the distribution of optical signals. More particularly, the invention relates to radial systems, apparatus and methods for distributing optical signals.

2. Description of Related Art

One of the most important recent developments in the field of fiber optic communications is the emergence of the feasibility of fiber management and distribution systems, arrangements and devices for delivering optical fiber signals to a particular location or group of locations. Such applications typically are referred to as Fiber to the x (FTTx) applications. One of the more popular FTTx applications is Fiber to the Premises (FTTP) or Fiber To The Home (FTTH), in which optical signal capabilities are routed from a central office or other distribution location to a plurality of homes in that particular location via optical fiber and one or more optical connectors and/or other optical connection devices.

Various conventional FTTx products exist, including connection devices based on or adaptable with the Multi-fiber Push On (MPO) connector. For example, such MPO-based connection devices include the InstaPATCH™ MPO module and trunk cable design offerings by Systimax Solutions, the Plug & Play offering from Corning Cable Systems, and the fiber optic infrastructure products by Red Hawk CDT. Also, Blue Helix offers MPO modules and module patch panels for FTTx applications.

Conventionally, FTTx applications use planar lightwave circuit (PLC) technology in various packaging structures. Typically, these packaging structures include a splitter housing that splits a single optical fiber into a plurality of individual fiber pigtails emanating from the splitter housing. The fiber pigtails, which each typically are approximately 4 to 6 feet in length, are used to administer various fiber routing assignments within a fiber distribution location and/or between locations (e.g., outside plant administration points). Typically, the routing termination points comprise arrays of optical adapters.

However, many of these packaging structures have as many as 400 fiber pigtails emanating therefore. With such a relatively large number of individual fiber pigtails, congestion and tangling of the fiber pigtails become concerns. Also, accurate routing of the fiber pigtails and general circuit administration and storage are issues with these types of packaging structures.

Accordingly, it would be desirable to have available a fiber management and distribution apparatus and system that does not suffer from the routing and storage problems typically experienced by conventional management and distribution arrangements.

SUMMARY OF THE INVENTION

The invention is embodied in an apparatus and system for managing and radially distributing optical fibers from a first location, such as a central office, to a plurality of destination locations, such as homes within a neighborhood. The apparatus includes a distribution panel having a central hub or ring, and both a plurality of optical input elements and a plurality of optical output elements disposed radially around the central hub. The optical input elements split the fibers in main feeder fiber bundles coupled from the first location into a plurality of individual fibers that are routed to the central hub. The central hub radially distributes the plurality of individual fibers to appropriate optical output elements. The optical output elements are coupled to destination fibers routed to the plurality of destination locations. The radial configuration of the apparatus provides a central breakout point for fiber distribution, thus improving fiber organization and routing management compared to conventional routing and distribution systems.

DETAILED DESCRIPTION OF EXEMPLARY EMBODIMENTS

Figure 1:
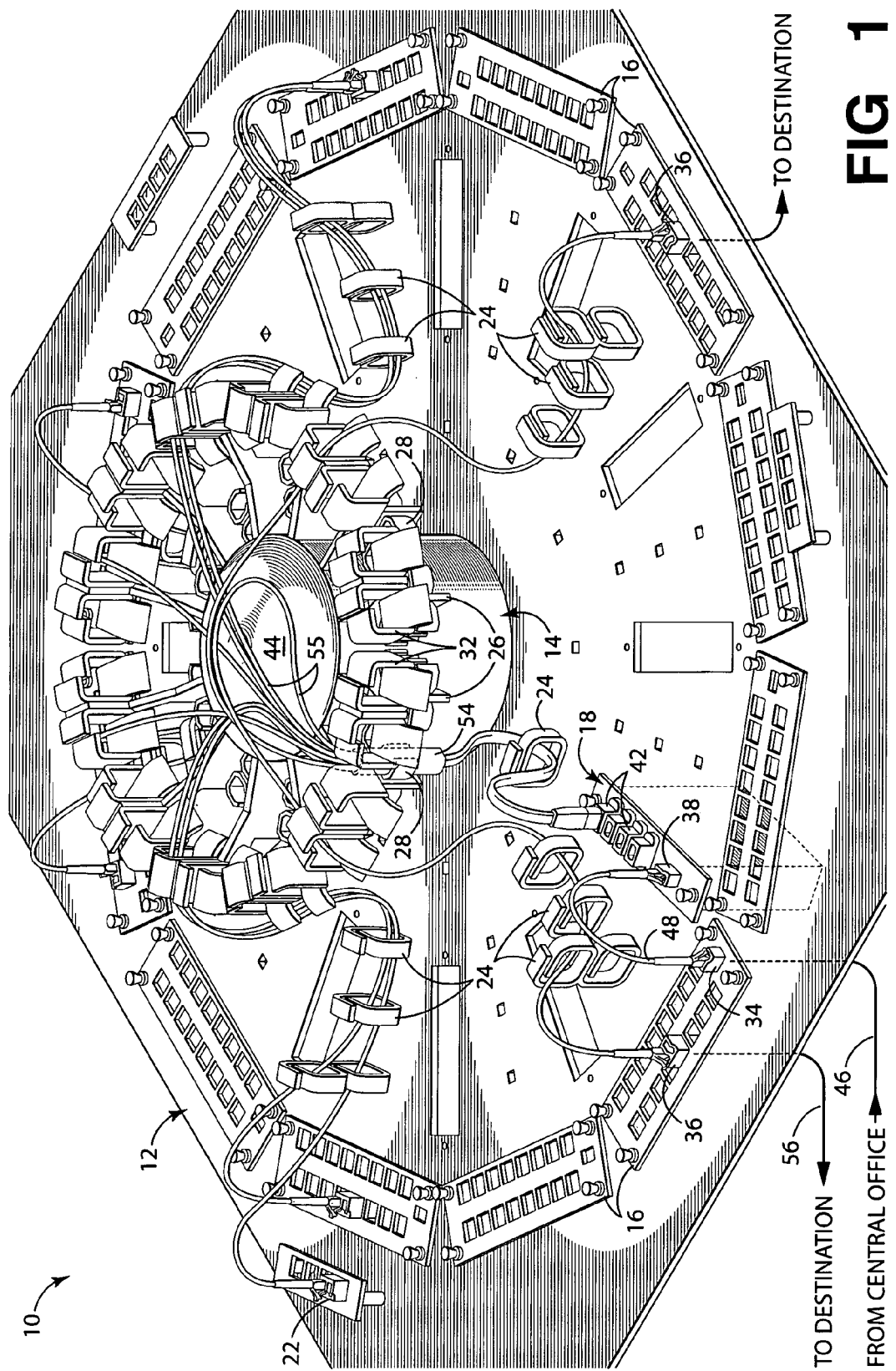
FIG. 1 is a simplified, perspective view of a radial optical distribution panel according to embodiments of the invention.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Embodiments of the invention include a radial optical management and distribution system architecture and apparatus that allows optical fibers from a first (source) location, such as a central office main feeder fiber bundle, to be routed to a plurality of second (destination) locations, such as feeder lines to homes within a neighborhood. The distribution apparatus includes at least one input element that receives optical fibers from the first location and at least one output element that is connected to fibers from the plurality of second locations. The distribution apparatus also includes a central hub portion that routes optical fibers from the input element to output element in a relatively simplified, organized and systematic manner compared to conventional distribution systems.

Figure 2:
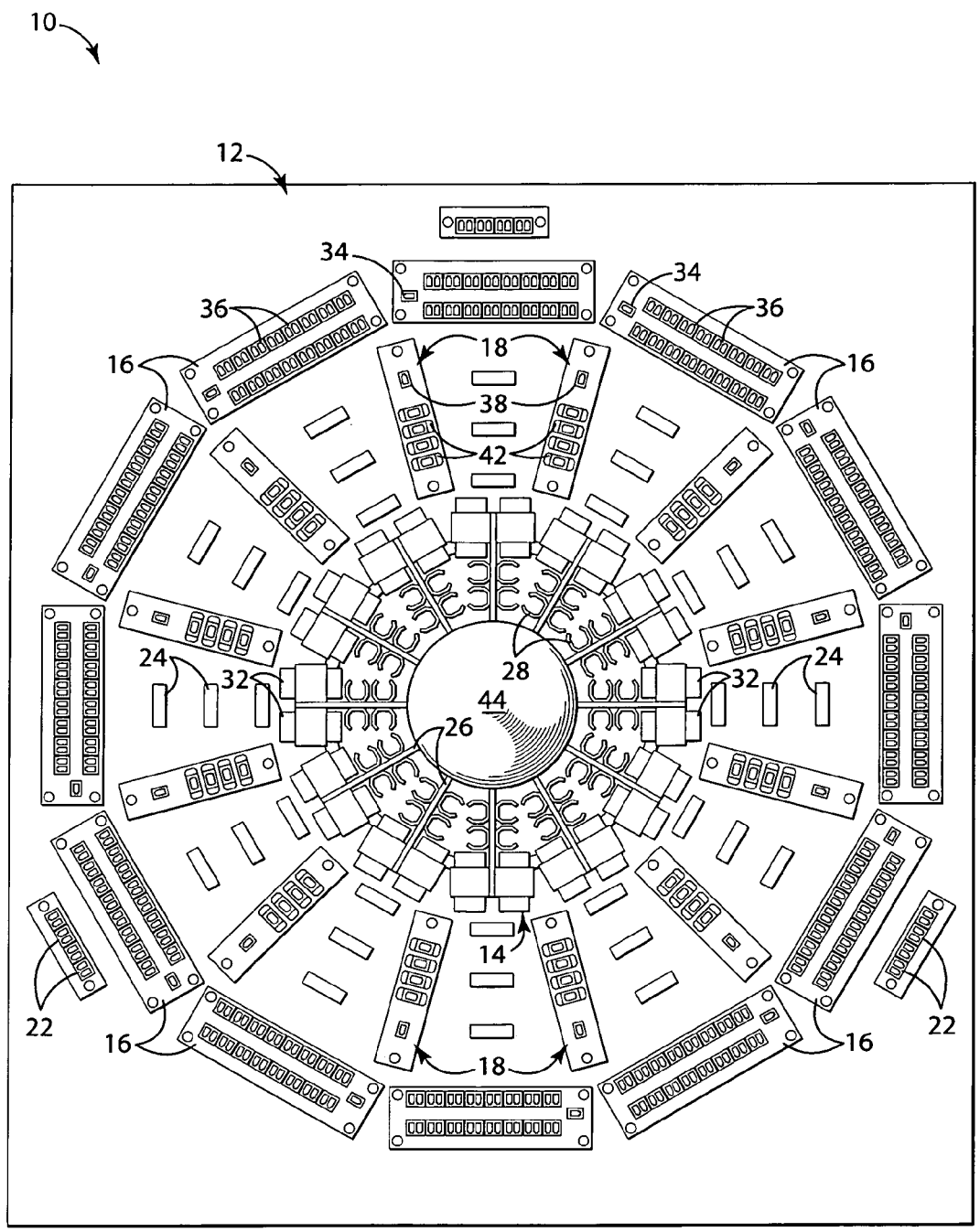
FIG. 2 is a top, plan view of the radial optical distribution panel shown in FIG. 1.

Referring now to FIGS. 1 and 2, shown are a perspective view (FIG. 1) and a top, plan view (FIG. 2) of a radial optical distribution apparatus 10 according to embodiments of the invention. The apparatus 10 includes a distribution panel or cabinet panel 12, which is a frame, face plate or other suitable structure for supporting the other components of the distribution apparatus 10. Such components include a central hub (shown generally as 14), one or more adapter panels 16, one or more splitter modules 18, one or more parking adapters 22, and one or more retainer rings 24. As will be discussed in greater detail hereinbelow, the central hub 14 includes a plurality of support arms 26, each of which can support at least one fanout holder or clamp 28 and at least one routing ring 32.

The distribution panel 12 typically is a frame or face plate having a generally planar shape. The distribution panel 12 is made of metal, structurally stable plastic, or other suitable material. The distribution panel 12 has formed therein a plurality of apertures dimensioned to receive and/or mount the various other components of the distribution apparatus 10.

The adapter panels 16 include one or more optical fiber adapters suitable for coupling a pair of optical fiber connectors, e.g., LC connectors. According to embodiments of the invention, the adapter panels 16 may include one or more input element adapters 34, e.g., central office or head end ports. As will be discussed in greater detail hereinbelow, such adapters are used to couple a central office feeder fiber to a jumper fiber, which typically is a jumper to an appropriate splitter module 18. Although the input element adapters 34 are shown as part of the adapter panels 16 in FIGS. 1 and 2, such is not necessary. According to embodiments of the invention, the input element adapters 34 can be located at any suitable location on the distribution panel 12.

The adapter panels 16 also may include one or more output element adapters 36, e.g., customer ports or outbound ports. The output element adapters 36 serve as coupling or termination ports between optical fibers routed from the central hub 14 and fibers feeds to individual homes or other destination locations. Although the distribution panel 12 is shown with twelve (12) adapter panels 16 coupled thereto in FIG. 1, distribution panels 12 according to embodiments of the invention can have any suitable number of adapter panels 16.

The splitter modules 18 include any suitable optical power splitting module, device, or other power splitting arrangement. For example, such a splitter module 18 includes the optical fiber power splitter module disclosed in detail in the co-pending application Ser. No. 11/041,816. The splitter module disclosed therein includes a 1×N (e.g., 1×32) packaging structure that uses planar lightwave circuit (PLC) technology to split a single, LC-adaptable input fiber into a plurality of MPO-adaptable or other output fiber groups. The splitter modules shown in FIGS. 1 and 2 have at least one input adapter port 38 and a plurality of output adapter ports 42, although such is not necessary.

According to embodiments of the invention, the central hub 14 is a support structure located on the distribution panel 12 central to any adapter panels 16 and splitter modules 18 that are coupled to the distribution panel 12. As discussed hereinabove, the distribution panel 12 has a plurality of locations for coupling thereto an appropriate number of adapter panels 16 and splitter modules 18. Such locations are disposed radially around the central hub 14, e.g., generally as shown in FIGS. 1 and 2. According to embodiments of the invention, adapter panels and splitter modules, whether in use or not, often are positioned radially around the central hub 14.

The plurality of support arms 26 on the central hub 14 typically radiate outward from a central base portion (shown generally as 44) of the central hub 14. The number of support arms 26 typically corresponds to the number of splitter modules 18 and the number of adapter panels 16 that the distribution panel 12 can accommodate, although such is not necessary. The fanout holders or fanout clamps 28, which are attached or otherwise suitably fixed to one or more of the support arms 26, are dimensioned to hold a fanout block portion of a fiber fanout. The fanout holders 28 are dimensioned and positioned to provide strain relief and bundled organization to fiber fanout arrangements coupled between the output ports 42 of the splitter modules 18 to the central hub 14. Similarly, the plurality of routing rings 32 fixed to the support arms 26 provides strain relief and organizational support in routing individual fibers from the central hub 14 to their appropriate adapter panel 16, as will be discussed in greater detail hereinbelow.

The parking adapters 22 include one or more optical fiber adapters suitable for terminating an optical fiber with a connector, such as an LC connector. The parking adapters 22 typically are coupled to the distribution panel 12 at locations symmetrically around the central hub 14 and the plurality of splitter modules 18 and adapter panels 16, although such configuration is not necessary. The parking adapters 22 are useful in terminating unused individual fibers routed from the central hub 14. The unused fibers typically are routed from the central hub 14, through one of the routing rings 32, and then to an appropriate parking adapter 22. The unused fibers typically are terminated at one of the parking adapters 22 until the unused fibers are to be put into use, i.e., until the unused fibers are to be terminated at an appropriate customer port 36. As will be more clear from discussions hereinbelow, the placement and configuration of the parking adapters 22 contributes to the overall routing simplification and organization of the distribution panel 12.

The plurality of retainer rings 24 are coupled to the distribution panel 12 at locations that allow fibers routed from the central hub 14 to be routed to appropriate adapter panels 16. Typically, the retainer rings 24 are located on the distribution panel 12 somewhere between the central hub 14 and the radially-disposed adapter panels 16, although such is not necessary. Also, typically, additional retainer rings 24 generally correspond to a particular adapter panel 16, although such correspondence is not necessary. In this manner, each retainer ring 24 can accommodate a plurality of fibers routed through the central hub 14 to a particular adapter panel 16, as will be discussed in greater detail hereinbelow. Like the routing rings 32 on the support arm 26, and like the parking adapters 22, the retainer rings 24 contribute to the overall routing organization of the distribution panel 12.

As previously discussed, embodiments of the invention include an optical management and distribution system configured to route optical signals from a first external location to a central distribution hub through a series of fiber adapters, splitter modules and individual fiber fanouts. The central hub radially distributes the individual fiber fanouts to appropriate fiber adapters, which couple to destination fibers from a second external location.

By comparison, conventional optical fiber distribution systems typically use an input panel or array of termination points, an output panel or array of termination points, and a plurality of individual fiber jumpers cross-connected therebetween to route fiber signals from a first location to a second location. There is no centrally located breakout point. Thus, because of the dimensions of the array grids, and their configurations, each of the fiber jumpers must have a suitable length (e.g., 4 to 6 feet each) to be able to satisfy all possible cross-connect combinations. As such, the relatively excessive length of the individual fiber jumpers presents storage issues for the slack of the individual fibers jumpers in these conventional systems. Moreover, the grid array cross-connect configuration often causes fiber tangling issues, especially for subsequent or second generation cross-connections, since there typically is no systematic organization inherent to this conventional cross-connect configuration.

According to embodiments of the invention, the radial architecture configuration allows optical fibers to be routed from any splitter module on the distribution panel to the central distribution hub. From the central hub, the fibers are routed radially outward to an appropriate fiber adapters, also on the distribution panel. The radial distribution configuration simplifies the overall routing configuration of the fibers. The centrally located hub provides a breakout point for fiber distribution that simplifies fiber routing in the system. The radial distribution configuration also allows for bundling of the fibers routed to the central hub, thus reducing fiber congestion and fiber slack issues typically present in conventional configurations.

In operation, a plurality of main feeder fiber bundles are routed from a central office (not shown) or other location to one or more distribution panels. The distribution panels typically reside in a distribution cabinet (not shown), which is suitably located in the given distribution location (e.g., a neighborhood of homes) for distribution throughout the location. For example, a main feeder fiber bundle comprising 12 LC-compatible optical fibers is routed to each distribution panel 12 in the cabinet. The LC-compatible optical fibers are broken out and each individual fiber is coupled to one end of the central office (head end) adapter 34. For purposes of illustration, only one main feeder fiber 46 is shown in FIGS. 1 and 2. However, it should be understood that any suitable number of main feeder fibers can be routed to the distribution apparatus 10. Typically, the individual feeder fiber 46 is connected to the port of the central office adapter 34 located on the back side or underside of the distribution panel 12. However, such is not necessary.

A fiber jumper (shown generally as 48), such as an LC jumper, connects the port of the central office adapter 34 located on the front or top side of the distribution panel 12 to the input adapter port 38 of the splitter module 18. For purposes of illustration, only one jumper 48 is shown, however, it should be understood that a plurality of jumpers can be used to couple each central office adapter 34 to a corresponding splitter module 18.

Each of the plurality of output adapter ports 42 of the splitter module 18 typically comprises a multi-fiber port, e.g., a port compatible with a MPO connector or other suitable multi-fiber connector. The splitter module 18 splits the optical signal coupled to the input adapter port 38 of the splitter module 18 into at least one multi-fiber group of fibers coupled to one or more of the output adapter ports 42 of the splitter module 18. See, e.g., the co-pending application Ser. No. 11/041,816 for more detail regarding the splitter module 18.

Figure 3:
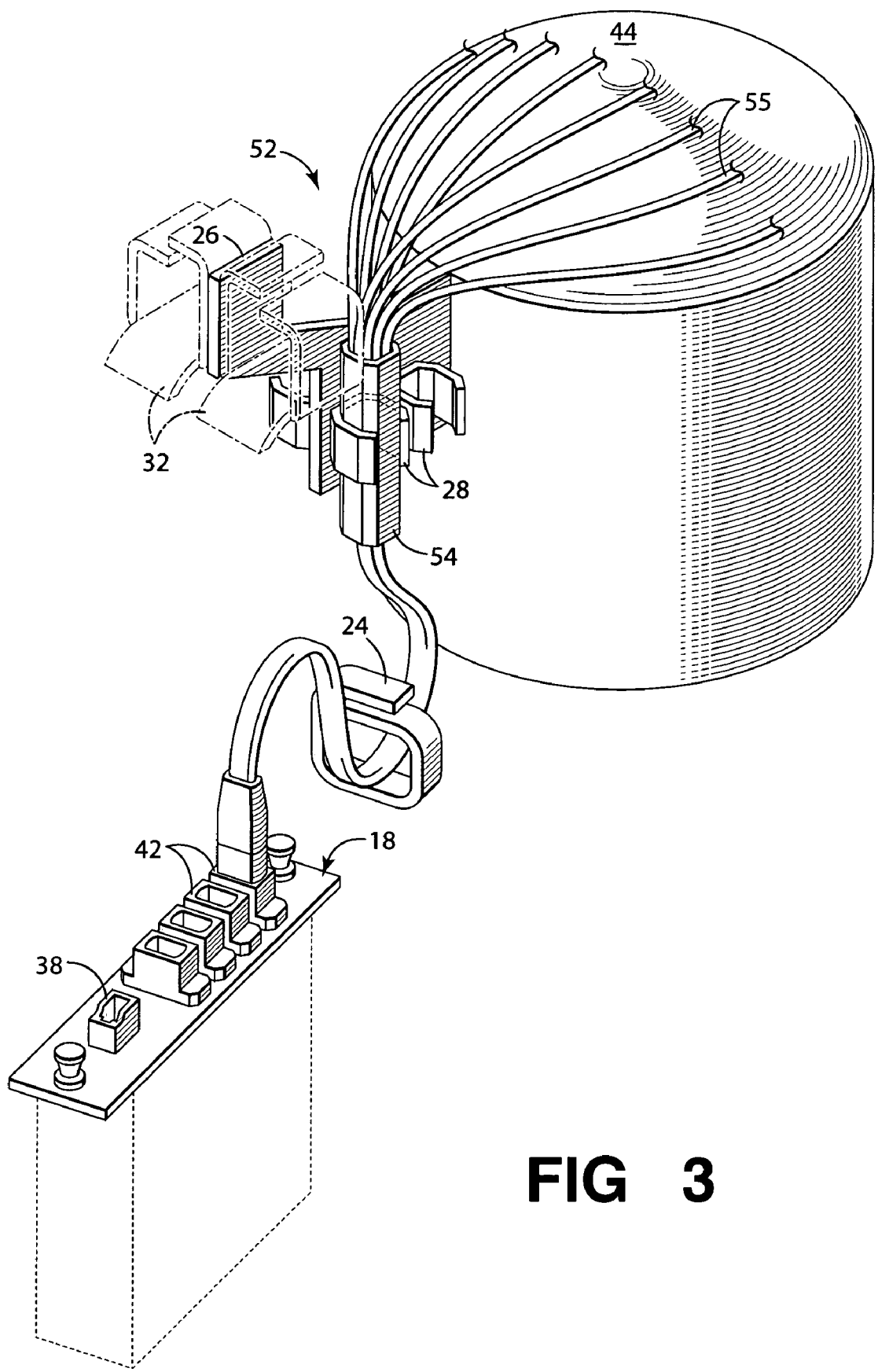
FIG. 3 is a simplified, perspective view showing the coupling of an optical fiber fanout between a splitter module and a fiber fanout holder according to embodiments of the invention.

From the output adapter ports 42 of the splitter module 18, one or more optical fiber fanouts 52 are routed to the central hub 14. Alternatively, individual fiber pigtails are routed from the output adapter ports 42 to the central hub 14. Referring now to FIG. 3, with continuing reference to FIGS. 1 and 2, shown is a simplified, perspective view of a optical fiber fanout (shown generally as 52) being coupled between one of the output adapter ports 42 of a splitter module 18 and one of the fanout holders 28. As shown, the fanout 52 includes a fanout block 54, which is dimensioned to be clamped within the fanout holder 28, which, as discussed hereinabove, is attached to one of the support arms 26 in the central hub 14.

Although only one fanout 52 is shown being coupled from the splitter module 18 to the central hub 14, it should be understood that a plurality of fanouts 52 are routed from each splitter module 18 to the central hub 14. For example, a plurality of MPO/LC fanouts are routed from the output adapter ports 42 of the splitter module 18 to the central hub 14 via the fanout holder 28. MPO/LC fanouts typically comprise an 8-fiber MPO connector at one end that fans out into 8 individual LC-connectored optical fibers 55 at the other end. The use of fanouts 52, such as MPO/LC fanouts, simplifies the routing scheme from the splitter modules 18 to the central hub 14.

The fanout block 54 facilitates the routing of the individual fanout fibers 55 to the central hub 14. The fanout block 54 typically provides support for the plurality of individual fibers from the fanout 52 by collectively encapsulating a portion of the individual fibers at a location approximately equal in distance to the distance from the splitter modules 18 to the fanout holders 28 on the support arms 26 of the central hub 14.

From the fanout holders 28, the individual fibers 55 are routed through the central hub 14 and then radially outward from the central hub 14 toward their appropriate output element adapter 36, e.g., their appropriate customer or outbound port. The consistent distance between the central hub 14 and each output element adapter 36 allows the individual fibers in all of the fanouts 52 to be of similar length, and much shorter than in conventional arrangement, thus contributing to the overall organization of any routing scheme according to embodiments of the invention. However, as discussed, the system will work equally well with individual fiber pigtails, rather than one or more fiber fanouts, emanating directly from the optical splitter device.

Depending on which output element adapters 36 the individual fibers are being routed to, the individual fibers typically are routed through an appropriate routing ring 32, as each routing ring 32 generally corresponds to a particular adapter panel 16, to which a particular group of output element adapters 36 is a part of. In this manner, the routing rings 32 provide strain relief for the fibers passing therethrough. The routing rings 32 also act to maintain the overall routing organization of the fibers routed to each of the output element adapters 36. As discussed hereinabove, the routing rings 32 are supported by the support arms 26 of the central hub 14.

Also, for additional organization and strain relief, the individual fibers routed from the central hub 14 through the routing rings 32 also can be routed through an appropriate retainer ring 24. Typically, each retainer ring 24 corresponds to a particular group of output element adapter 36 on a particular adapter panel 16, and is located accordingly on the front or top side of the distribution panel 12.

The individual fibers that are routed to the customer ports (i.e., the output element adapters 36) are coupled to corresponding output fibers that are connected to the bottom side or underside of the output element adapters 36. Such fibers are destination feeder fibers (shown generally as 56) that are routed to individual destination locations, e.g., individual homes in a neighborhood. For purposes of illustration, only two destination feeder fibers are shown in FIGS. 1 and 2. However, it should be understood that any suitable number of destination feeder fibers 56 can be routed from the distribution apparatus 10.

Because each fiber fanout 52 comprises a group of fibers (e.g., 8 fibers), fiber routing through the central hub 14 occurs in groups. Accordingly, not all fibers in the fanout group may be set for use at a given time. Thus, not all individual fibers in the fanout 52 may have a destination output element adapter 36. As discussed previously herein, those individual fibers that currently are not in use typically are routed to an appropriate parking adapter 22. As with the individual fibers currently in use, the individual fibers routed to one of the parking adapters 22 can be routed through an appropriate routing ring 32 and an appropriate retainer ring 24. As each fiber routed to one of the parking adapters 22 is to be put into use, the fiber is rerouted to the appropriate customer port of the appropriate output element adapter 36.

According to embodiments of the invention, the radial configuration allows for systematic scalability. Adapter panels 16, splitter modules 18 and their support components (e.g., routing rings 32 and parking adapters 22) can be added to the distribution panel 12 as needed. In this manner, the capacity of the distribution panel 12 can increase at the same rate as the number of individual fibers needed in the system grows. Such scalability provides an important advantage over conventional arrangements, whose capacity typically can not be expanded in such manner.

Figure 4:
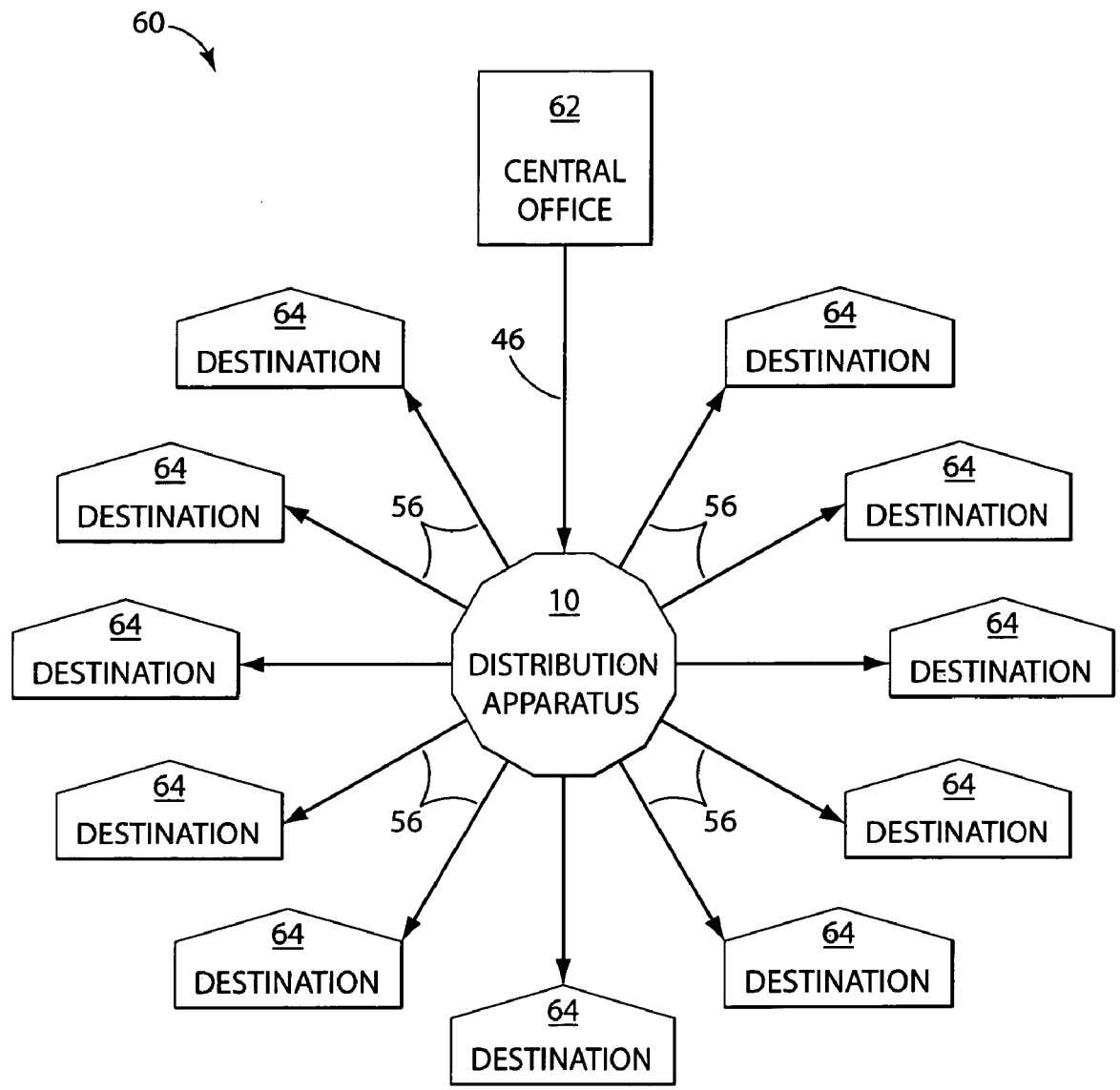
FIG. 4 is a simplified, schematic view of a distribution system according to embodiments of the invention.

Referring now to FIG. 4, shown is a simplified, schematic view of a distribution system 60 according to embodiments of the invention. The system 60 includes a central office 62, a distribution apparatus, e.g., the distribution apparatus 10 discussed hereinabove and shown in FIGS. 1 and 2, and a plurality of destination locations 64, e.g., homes in a neighborhood.

As discussed hereinabove, one or more main feeder fiber bundles are routed from the central office 62 to the distribution apparatus 10. Typically each fiber bundle includes 12 LC-connectored fibers 46, each of which are coupled to an appropriate head end port via the back side or underside of the appropriate input element adapter 34 on the distribution apparatus 10. As discussed hereinabove, the distribution apparatus 10 makes use of splitter modules, fanouts and LC connectors along with its radial distribution architecture to route a plurality of individual fibers to the appropriate outbound or customer ports of the appropriate output element adapters 36. For example, for 12 main feeder fibers routed to the distribution apparatus 10, and with each main feeder fiber being split into 32 fibers, approximately 384 individual fibers are routed through the central hub 14 of the distribution apparatus 10 and distributed radially outward to the appropriate customer ports. The individual fibers routed to the customer ports are coupled to corresponding destination feeder fibers 56, which, as discussed hereinabove, are coupled to the bottom side or underside of the output element adapters 36. The destination feeder fibers 56 are routed to the individual homes 64 or other destination locations.

It will be apparent to those skilled in the art that many changes and substitutions can be made to the embodiments of the invention herein described without departing from the spirit and scope of the invention as defined by the appended claims and their full scope of equivalents.

The invention claimed is:

1. An apparatus for distributing a plurality of optical fibers, the apparatus comprising:
    a distribution panel configured to couple thereto at least one optical input element and at least one optical output element; and
    a central hub coupled to the distribution panel,
    wherein the at least one optical input element is configured to receive at least one optical fiber from a source external to the apparatus and route a plurality of optical fibers to the central hub, and
    wherein the central hub is configured to radially distribute at least one of the plurality of optical fibers to the at least one optical output element for distribution from the apparatus.

2. The apparatus as recited in claim 1, wherein the at least one optical fiber input element further comprises at least one optical splitter device for splitting optical power from at least one single optical fiber to at least one plurality of optical fibers.

3. The apparatus as recited in claim 2, wherein the distribution panel is configured to couple the optical fiber splitter modules radially around the central hub.

4. The apparatus as recited in claim 1, wherein the at least one optical fiber input element further comprises at least one central office port.

5. The apparatus as recited in claim 1, wherein the at least one optical fiber input element further comprises at least one adapter panel having at least one central office port.

6. The apparatus as recited in claim 1, wherein the at least one optical fiber output element further comprises at least one adapter panel having at least one customer port.

7. The apparatus as recited in claim 6, wherein the distribution panel is configured to couple the adapter panels radially around the central hub.

8. The apparatus as recited in claim 6, wherein at least one of the adapter panels coupled to the distribution panel is optically coupled to at least one location external to the apparatus.

9. The apparatus as recited in claim 1, wherein the at least one optical fiber output element further comprises at least one customer port.

10. The apparatus as recited in claim 1, wherein the central hub includes at least one routing ring for routing one or more optical fibers from the central hub to the optical output element.

11. The apparatus as recited in claim 1, further comprising at least one retainer ring coupled to the distribution panel for routing one or more optical fibers from the central hub to the optical output element.

12. The apparatus as recited in claim 1, further comprising at least one parking adapter coupled to the distribution panel for terminating at least one optical fiber routed from the central hub.

13. The apparatus as recited in claim 1, wherein the distribution panel further comprises a planar face plate.

14. A system for distributing a plurality of optical fibers, the system comprising:
    a central office;
    a distribution apparatus coupled to the central office via at least one main feeder line, the distribution apparatus comprising
        a distribution panel,
        at least one optical input element coupled to the distribution panel,
        a central hub coupled to the distribution panel, and
        at least one optical output element coupled to the distribution panel,
    wherein the at least one optical input element is coupled to at least one main feeder line routed from the central office, wherein the at least one optical input element routes a plurality of optical fibers to the central hub, and wherein the central hub radially distributes at least one of the plurality of optical fibers to the at least one optical output element; and
    a plurality of destination locations coupled to the at least one optical output element via at least one destination feeder fiber.

15. The system as recited in claim 14, wherein the at least one optical fiber input element further comprises at least one optical splitter device for splitting optical power coupled from a single main feeder line to a plurality of individual optical fibers.

16. The system as recited in claim 14, wherein the at least one optical fiber input element further comprises at least one central office port.

17. The system as recited in claim 14, wherein the at least one optical fiber output element further comprises at least one adapter panel having at least one customer port.

18. The system as recited in claim 14, wherein the at least one optical fiber output element further comprises at least one customer port.

* * * * *